United States Patent
Rashidi et al.

(10) Patent No.: US 10,928,807 B2
(45) Date of Patent: Feb. 23, 2021

(54) FEATURE EXTRACTION AND FAULT DETECTION IN A NON-STATIONARY PROCESS THROUGH UNSUPERVISED MACHINE LEARNING

(71) Applicant: Honeywell International Inc., Morris Plains, NJ (US)

(72) Inventors: Bahador Rashidi, Edmonton (CA); Meenakshi Sundaram Krishnaswamy, Edmonton (CA); Qing Zhao, Edmonton (CA)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/014,059

(22) Filed: Jun. 21, 2018

(65) Prior Publication Data

US 2019/0391568 A1    Dec. 26, 2019

(51) Int. Cl.
*G05B 19/418*    (2006.01)
*G05B 13/02*    (2006.01)

(52) U.S. Cl.
CPC ..... *G05B 19/4184* (2013.01); *G05B 13/0265* (2013.01); *G05B 2219/31026* (2013.01);
(Continued)

(58) Field of Classification Search
CPC ............ G05B 19/4184; G05B 13/0265; G05B 2219/31026; G05B 2219/33034; G05B 2219/37214; G05B 23/0254; G05B 19/0428; G05B 23/024; G05B 19/042; G06F 11/2257
(Continued)

(56) References Cited

U.S. PATENT DOCUMENTS

| 5,602,761 A * | 2/1997 | Spoerre ................. G01H 1/003 702/179 |
| 2003/0214305 A1* | 11/2003 | Von Wendorff ... G05B 19/4067 324/500 |

(Continued)

OTHER PUBLICATIONS

Krishnaswamy et al., "Autonomous Predictive Real-Time Monitoring of Faults in Process and Equipment", U.S. Appl. No. 16/012,542, filed Jun. 19, 2018, 52 pages.
(Continued)

*Primary Examiner* — Rocio Del Mar Perez-Velez
*Assistant Examiner* — Alicia M. Choi
(74) *Attorney, Agent, or Firm* — Paschall & Associates, LLC; Anthony Miologos; James C. Paschall (57) ABSTRACT

An apparatus, method, and non-transitory machine-readable medium provide for improved feature extraction and fault detection in a non-stationary process through unsupervised machine learning. The apparatus includes a memory and a processor operably connected to the memory. The processor receives training data regarding a field device in an industrial process control and automation system; extracts a meaningful feature from the training data; performs an unsupervised classification to determine a health index for the meaningful feature; identifies a faulty condition of real-time data using the health index of the meaningful feature; and performs a rectifying operation in the industrial process control and automation system for correcting the faulty condition of the field device.

12 Claims, 7 Drawing Sheets

(52) U.S. Cl.
CPC ............. *G05B 2219/33034* (2013.01); *G05B 2219/37214* (2013.01)

(58) Field of Classification Search
USPC ......................................................... 700/110
See application file for complete search history.

(56) References Cited

U.S. PATENT DOCUMENTS

| | | | | |
|---|---|---|---|---|
| 2011/0066391 | A1* | 3/2011 | AbuAli ................. | G06Q 10/06 702/61 |
| 2011/0290024 | A1* | 12/2011 | Lefler .................... | G01H 1/003 73/579 |
| 2016/0179599 | A1* | 6/2016 | Deshpande ........... | G06F 16/215 714/807 |
| 2018/0144243 | A1* | 5/2018 | Hsieh ...................... | G06N 3/08 |

OTHER PUBLICATIONS

Rashidi et al., "A Robust Multivariate Fault Detection Scheme for Process Monitoring", Abstract and Presentation, 67th Canadian Chemical Engineering Conference, Oct. 2017, 1 page.
Gao et al., "Fault detection in time-varying chemical process through incremental principal component analysis", Chemometrics and Intelligent Laboratory Systems, vol. 158, 2016, pp. 102-116.
Waller, "Data-Based Testing for Nonlinearity in Dynamical Systems: The Use of Surrogate Data", IEEE Transactions on Control Systems Technology, vol. 27, No. 2, 2017, 10 pages.
Haghani et al., "Quality-Related Fault Detection in Industrial Multimode Dynamic Processes", IEEE Transactions on Industrial Electronics, vol. 61, No. 11, Nov. 2014, pp. 6446-6453.
Huang et al., "Dynamic process fault detection and diagnosis based on dynamic principal component analysis, dynamic independent component analysis and Bayesian inference", Chemometrics and Intelligent Laboratory Systems, vol. 148, Nov. 2015, pp. 115-127.
Reece et al., "Anomaly Detection and Removal Using Non-Stationary Gaussian Processes", Jul. 2015, 9 pages.
Meng et al., "A hybrid fault diagnosis method using morphological filter-translation invariant wavelet and improved ensemble empirical mode decomposition", Mechanical Systems and Signal Processing, vol. 50-51, Jan. 2015, pp. 101-115.
Calinon, "EE613 Machine Learning for Engineers: Nonlinear Regression", Robot Learning & Interaction Group, Idiap Research Institute, Nov. 2015, 44 pages.
Arnold et al., "Adaptive AR Modeling of Nonstationary Time Series by Means of Kalman Filtering", IEEE Transactions on Biomedical Engineering, vol. 45, No. 5, May 1998, pp. 553-562.
Bouguelia et al., "An adaptive algorithm for anomaly and novelty detection in evolving data streams", Data Mining and Knowledge Discovery, vol. 32, No. 6, Nov. 2018, pp. 1597-1633.
Li et al., "Recursive PCA for adaptive process monitoring", Journal of Process Control, vol. 10, No. 5, Oct. 2000, pp. 471-486.
Yin et al., "A comparison study of basic data-driven fault diagnosis and process monitoring methods on the benchmark Tennessee Eastman process", Journal of Process Control, vol. 22, No. 9, Oct. 2012, pp. 1567-1581.
Ding et al., "Adaptive kernel principal component analysis", Signal Processing, vol. 90, No. 5, May 2010, pp. 1542-1553.
Ku et al., "Disturbance detection and isolation by dynamic principal component analysis", Chemometrics and Intelligent Laboratory Systems, vol. 30, No. 1, Nov. 1995, pp. 179-196.
Tien et al., "Comparative Study of PCA Approaches in Process Monitoring and Fault Detection", 30th Annual Conference of the IEEE Industrial Electronics Society, Nov. 2004, pp. 2594-2599.
Rato et al., "Defining the structure of DPCA models and its impact on process monitoring and prediction activities", Chemometrics and Intelligent Laboratory Systems, vol. 125, Jun. 2013, pp. 74-86.
Wang et al., "Process Monitoring Approach Using Fast Moving Window PCA", Industrial & Engineering Chemical Research, vol. 44, No. 15, Jun. 2005, pp. 5691-5702.
Patcha et al., "An overview of anomaly detection techniques: Existing solutions and latest technological trends", Computer Networks, vol. 51, No. 12, Aug. 2007, pp. 3448-3470.
Botre et al., "Kernel PLS-based GLRT method for fault detection of chemical processes", Journal of Loss Prevention in the Process Industries, vol. 43, Sep. 2016, pp. 212-224.
Purarjomandlangrudi et al., "A data mining approach for fault diagnosis: An application of anomaly detection algorithm", Measurement, vol. 55, Sep. 2014, pp. 343-352.
Agrawal et al., "Survey on Anomaly Detection using Data Mining Techniques", Procedia Computer Science, vol. 60, 2015, pp. 708-713.
Sakurada et al., "Anomaly Detection Using Autoencoders with Nonlinear Dimensionality Reduction", Proceedings of the MLSDA 2014 2nd Workshop on Machine Learning for Sensory Data Analysis, Dec. 2014, 8 pages.
Wang et al., "An Adaptive T2 Chart for Monitoring Dynamic Systems", Journal of Quality Technology, vol. 40, No. 1, Jan. 2008, pp. 109-123.

* cited by examiner

FEATURE EXTRACTION AND FAULT DETECTION IN A NON-STATIONARY PROCESS THROUGH UNSUPERVISED MACHINE LEARNING

TECHNICAL FIELD

This disclosure relates generally to process health monitoring systems. More specifically, this disclosure relates to systems and methods for improved features extraction and fault detection in a non-stationary process through unsupervised machine learning.

BACKGROUND

Industrial process control and automation systems are routinely used to automate large and complex industrial processes. These types of systems typically include meters to monitor the industrial processes and provide information to the business, for example to allow for auditing of the industrial processes and to monitor for failures in the industrial processes. Additionally, data from the meters may be used to perform predictive monitoring to estimate upcoming faults with sufficient lead time to correct those faults.

SUMMARY

This disclosure provides improved feature extraction and fault detection in a non-stationary process through unsupervised machine learning.

In a first embodiment, an apparatus provides for improved feature extraction and fault detection in a non-stationary process through unsupervised machine learning. The apparatus includes a memory and a processor operably connected to the memory. The processor receives training data regarding a field device in an industrial process control and automation system; extracts a meaningful feature from the training data; performs an unsupervised classification to determine a health index for the meaningful feature; identifies a faulty condition of real-time data using the health index of the meaningful feature; and performs a rectifying operation in the industrial process control and automation system for correcting the faulty condition of the field device.

In a second embodiment, a method provides for improved feature extraction and fault detection in a non-stationary process through unsupervised machine learning. The method includes receiving training data regarding a field device in an industrial process control and automation system; extracting a meaningful feature from the training data; performing an unsupervised classification to determine a health index for the meaningful feature; identifying a faulty condition of real-time data using the health index of the meaningful feature; and performing a rectifying operation in the industrial process control and automation system for correcting the faulty condition of the field device.

In a third embodiment, a non-transitory machine-readable medium provides for improved feature extraction and fault detection in a non-stationary process through unsupervised machine learning. The non-transitory machine-readable medium is encoded with executable instructions that, when executed, cause one or more processors to receive training data regarding a field device in an industrial process control and automation system; extract a meaningful feature from the training data; perform an unsupervised classification to determine a health index for the meaningful feature; identify a faulty condition of real-time data using the health index of the meaningful feature; and perform a rectifying operation in the industrial process control and automation system for correcting the faulty condition of the field device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

U.S. patent application Ser. No. 16/012,542 is directed to "AUTONOMOUS PREDICTIVE REAL-TIME MONITORING OF FAULTS IN PROCESS AND EQUIPMENT", and is hereby incorporated by reference.

Many research projects are proposing different algorithms for fault detection in process that satisfy the stationary condition of time-series (i.e. the mean and standard deviation of the process variables are time-invariant during process operation). There are some research projects that propose non-stationary process solutions, such as a modified version of the principal component analysis, i.e. adaptive principal component analysis (PCA). This method tries to update the mean, covariance matrix as well as a number of principal components in a block-wise manner. Hence, this method requires conducting singular-value decomposition (SVD) upon arrival of a new block of the test data. Another consideration of this method is that it tries to update the base-line model with any change in the process unless it abrupt and violate a tuning threshold. Moreover, this method requires a number of tuning parameters to be able to adapt the baseline model successfully.

The disclosure proposes a hybrid framework that integrates application of the principal component analysis and an unsupervised probability-based machine learning method for fault detection in aforementioned linear non-stationary methods. The followings are potential contributions of the proposed framework. This framework is designed to tackle the problem of fault detection in non-stationary processes, which has not been well addressed by other methods. The computational costs in this method are less than similar state-of-the-art methods, such as moving window PCA and adaptive PCA. Various new features are defined and extracted from a non-stationary process and have a physical interpretation for better understanding of the users. A new moving mean combined index is defined to compensate the normal mean changes of process variables. A novel overall health index is proposed with some favorable attributes to distinguish normal variable mean changes from different types of process faults.

Figure 1:
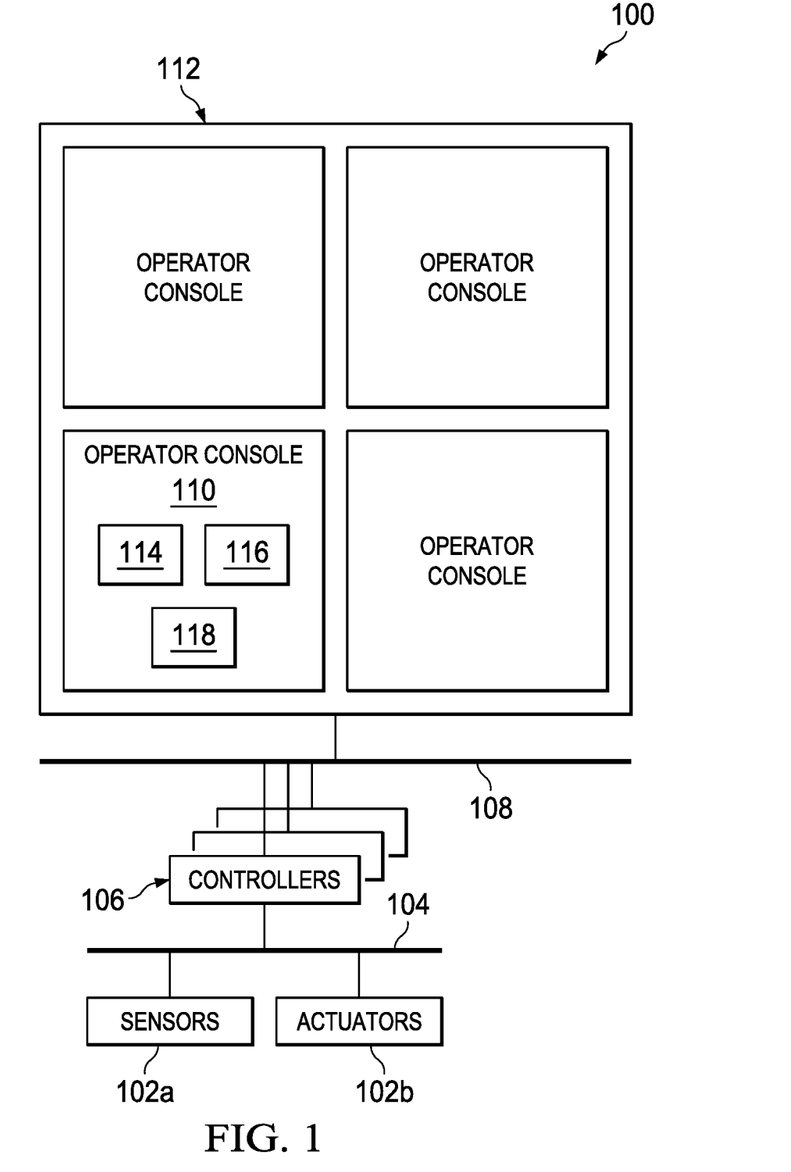
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

In accordance with this disclosure, a technique is provided for improving feature extraction and fault detection in a non-stationary process through unsupervised machine learning. The feature extraction and fault detection could be performed in the one or more controllers 106, the sensors 102a, and the actuators 102b.

Additional details regarding the technique for improving feature extraction and fault detection in a non-stationary process through unsupervised machine learning are provided below. Note that these details relate to specific implementations of the feature extraction and fault detection and that other implementations could vary as needed or desired.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
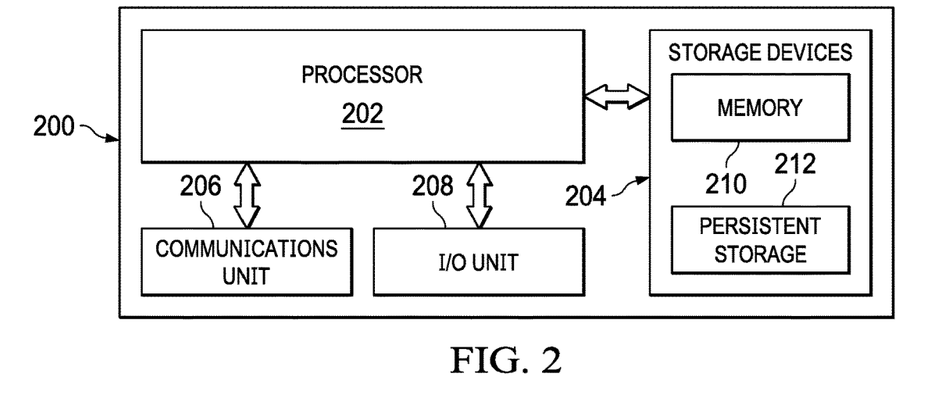
FIG. 2 illustrates an example device for improved feature extraction and fault detection in a non-stationary process through unsupervised machine learning according to this disclosure.

FIG. 2 illustrates an example device for improved feature extraction and fault detection in a non-stationary process through unsupervised machine learning according to this disclosure. In particular, FIG. 2 illustrates an example computing device 200. In some embodiments, the computing device 200 could denote an operator station, server, a remote server or device, or a mobile device. The computing device 200 could be used to run applications or perform one or more functions. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

The computing device 200 performs two main steps required in the proposed algorithm. The computing device 200 first performs feature selection and second performs unsupervised probability-based classification to optimally distinguish the normal time-varying (i.e. non-stationary) behavior of the process variables from faults. As a rule of thumb, thirty percent of the entire available training data is used for learning the base lines for extracting features and the remaining training data is used as cross-correlation batch for learning the behavior of the process.

Figure 3:
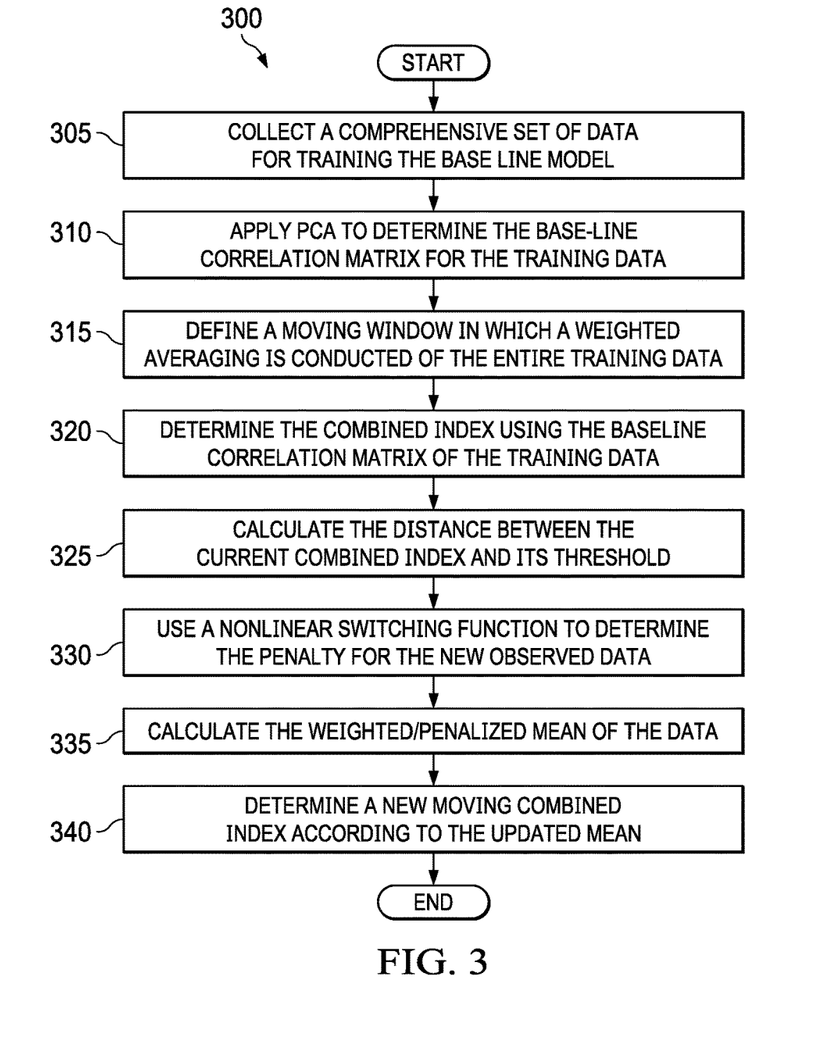
FIG. 3 illustrates an example method for feature extraction of a moving mean index ($\Phi_{MM}$) according to this disclosure.

FIG. 3 illustrates an example method 300 for feature extraction of a moving mean index ($\Phi_{MM}$) according to this disclosure. For example, the method 300 described in FIG. 3 may be performed in conjunction with the computing device 200 in FIG. 2.

In operation 305, the computing device 200 collects a comprehensive set of data for training the base line model. In this step, the computing device 200 determines the average mean and average variance of the entire training data and conducts the mean centering and unit variance to normalize the training data. This step is illustrated in the following equation 1 and equation 2.

$$X_{Tr} \rightarrow \text{mean} \Rightarrow m_0 \quad (1)$$

$$X_{Tr} \rightarrow \text{standard deviation} \Rightarrow V_0 \quad (2)$$

where $X_{Tr}$ represents the training data, $m_0$ represents the mean, and $V_0$ represents the variance.

In operation 310, the computing device 200 applies PCA to determine the base-line correlation matrix $\hat{\Pi} = \hat{p}\hat{p}^T$ and $\Lambda^{-1}$ (where $\Lambda$ is the eigenvalue matrix) for the training data and save the nominal normalizing parameters $m_0$ and $V_0$ that are calculated in the first step.

In operation 315, the computing device 200 define a moving window with the length of w in which a weighted averaging is conducted with respect to the Euclidian distance of the combined residual index $\phi$ from its nominal base-line threshold of the entire training data. As a result, the mean values of the variables used for mean centering are updated at each epoch time and resist to exceed threshold for the normal operating changes. However, if there is a significant mode change or malfunction happens in the process the mean will not compensate for the anomaly and successfully reveal the presence of faults.

In operation 320, the computing device 200 determines the combined index $\Phi$ using the baseline correlation matrix of the training data. The combined index can be determined by the following equation 3.

$$\Phi_{PCA}(i) = \Phi(i) = X_{test}(i) M_\Phi X_{test}(i)^T \quad (3)$$

In operation 325, the computing device 200 calculates the distance between the current combined index and its threshold, which is assumed to be 2. The distance between the combined index and the threshold can be calculated by the following equation 4 for the sample (i).

$$D(i) = \Phi(i) - 2 \quad (4)$$

In operation 330, the computing device 200 uses a nonlinear switching function to determine the penalty for the new observed test data. An example of the nonlinear switching function that is used could be the following example 5.

if $D(i)<0$ then $g_1(i)=1$ and $g_2(i)=0$ elseif($D(i) \geq 0$ && $D(i) \leq VR$)

$g_1(i)=0$ and $g_2(i)=1$ end $\quad (5)$

In operation 335, the computing device 200 calculates the weighted/penalized mean of the data. The weighted or penalized mean of the data could be calculated by the following equation 6.

$$m_{updated}(i) = g_1(i)m_0 + g_2(i)\sum_{j=1}^{w} \frac{w-j}{w} x_{test}(i-j) \qquad (6)$$

In operation 340, the computing device 200 determines a new moving mean combined index according to updated mean. The new moving combined index can be determined by the following equation 7.

$$\Phi_{MMPCA}(i) = X(i)MX(i)^T \qquad (7)$$

The new observed plant data is normalized using the updated mean and the same standard deviation. In the above steps, the VR stands for normal or expected range of variation of the process variables. Parameter VR can be determined by following two different means depending on the availability of the knowledge regarding validation of all or some the variables.

Option #1: The base-line model determined in the first step of the above framework can be utilized. A normal range of variation for r (i.e., r is the number of principal components) variables is known or determined for solving this equation. $X\tilde{p}\approx 0$, i.e. (m−r) equations for m unknown variables can be solved, where $\tilde{p}$ can be obtained from the PCA procedure.

Option #2: If the range of variations of the variables is limited, the variables with known range are flagged as inputs and the rest of the variables are flagged as the outputs. A partial least squares (PLS) method is used to obtain a regression relationship and further utilized to find the range. This method is also expandable to a dynamic PCA.

By following this updating rule for variables' means, it is assumed that the structure of the process is intact, which implies that the principal directions remain the same during the process. Any relatively slow changes in the mean or oscillations due to normal operating changes are compensated by the adaptive mean rule. On the other hand, if a severe malfunction occurs in the process, which results in the combined index $\phi$ significantly exceeding its threshold (UCL$_\phi$=2), the new updated combined index $\phi_R$ will not update and instead show that malfunction. This new updated $\phi_R$ is playing a supportive role for ordinary $\phi$ index calculated from the original base-line model without adaptation of the mean. In other words, the operator will have a better sense about the health of the process by monitoring both $\phi$ and $\phi$R simultaneously.

Figure 4:
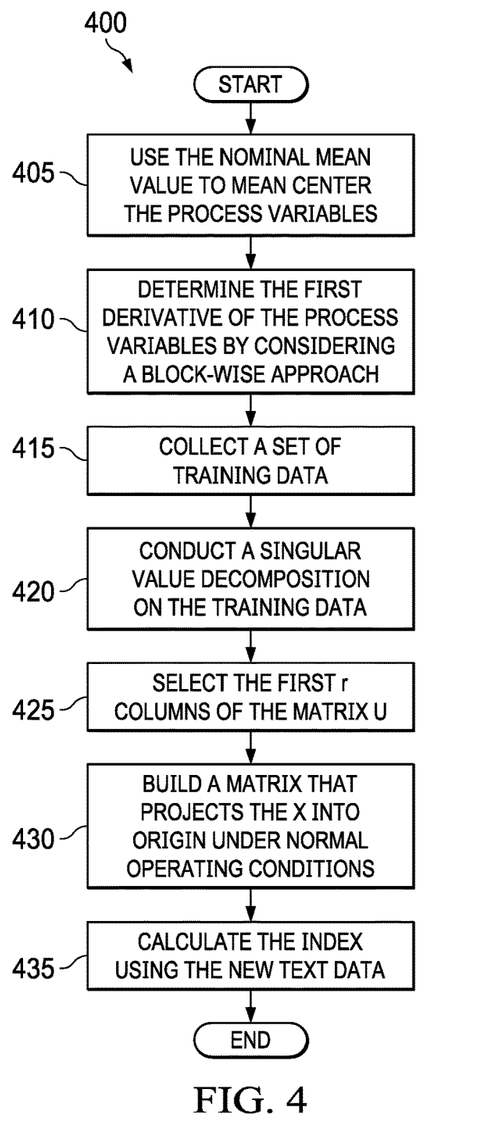
FIG. 4 illustrates an example method for feature extraction of a first order incremental index ($\Phi_{d1}$) according to this disclosure.

FIG. 4 illustrates an example method 400 for feature extraction of a first order incremental index ($\Phi_{d1}$) according to this disclosure. For example, the method 400 described in FIG. 4 may be performed in conjunction with the computing device 200 in FIG. 2.

The first order incremental index is designed to monitor the variation of the first derivative of process variables. Although the non-stationary mean changes of the process variables are unexpectedly random, in reality, it is assumed that the first derivatives of the changes do not cross an unknown boundary. For instance, in a continuous stirred-tank reactor (CSTR) process, there is a catalyst that degrades with time and induces a first order (i.e. ramp) change into two variables in long run. Also, in Penicillin chemical processes, some of the variables are subjected to time-varying mean changes due to the degradation. Moreover, in a distillation column process, the process variables have a similar trend to a random walk, but the changes have a bounded first derivative.

In operation 405, the computing device 200 uses the nominal mean value determined in the first step of algorithm to perform mean centering of process variables.

In operation 410, the computing device 200 numerically determines the first derivative of the process variables in a block-wise fashion with a length of $W_1$. In the case of discrete time series, the first difference of process variables can be determined by the following equation 8.

$$X_d^1(:,i) = \frac{1}{W_l}\left(\sum_{j=W_l}^{2W_l} X(:,i-j) - \sum_{j=1}^{W_l} X(:,i-j)\right) \qquad (8)$$

In operation 415, the computing device 200 collects a set of training data, such as $X_d^1 \in R^{N \times m}$.

In operation 420, the computing device 200 conducts a singular value decomposition on the training data. The singular value decomposition can be conducted by the following equation 9.

$$\frac{1}{\sqrt{N}} X_d^1 = U_d^1 \Lambda_d^1 V_d^{1T} \qquad (9)$$

In operation 425, the computing device 200 selects the first $r_{d1}$ columns of the matrix $U_{d1}$ which include 95% of the variables variance by following the cumulative percentage variance criteria.

In operation 430, the computing device 200 builds a matrix that projects the $X_{d1}$ into origin under normal operating condition. The matrix can be built using the following equation 10.

$$\tilde{\Pi}_d^1 = V_d^1(r_d^1:\text{end},:) V_d^1(r_d^1:\text{end},:)^T \qquad (10)$$

In operation 435, the computing device 200 calculates the index using the new test data. The index can be calculated using following equation 11.

$$\Phi_d^1(i) = x_{test} \tilde{\Pi}_d^1 x_{test}^T \qquad (11)$$

Figure 5:
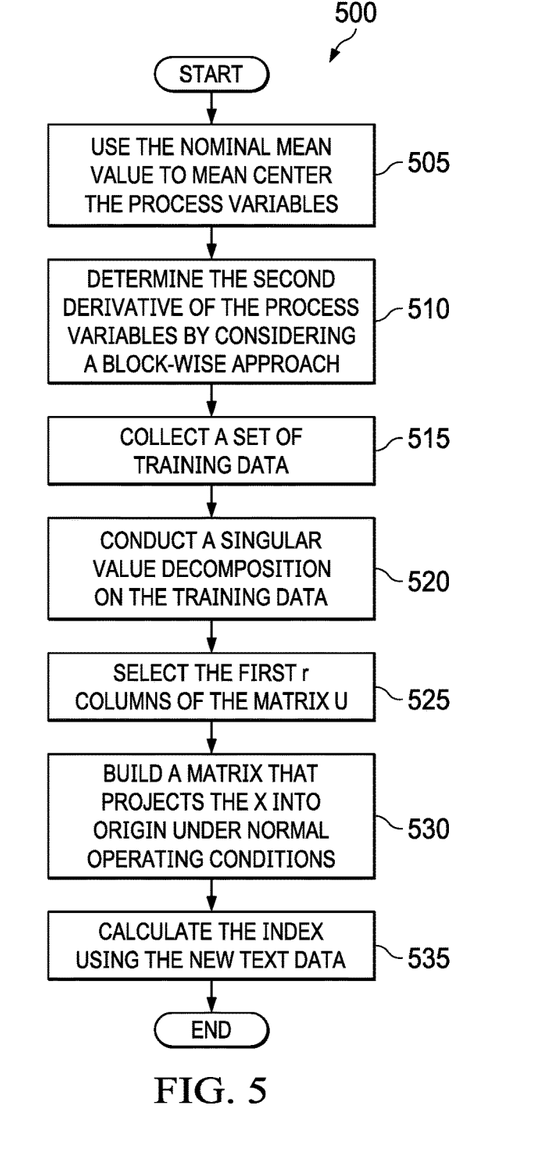
FIG. 5 illustrates an example method for feature extraction of a second order incremental index ($\Phi_{d1}$) according to this disclosure.

FIG. 5 illustrates an example method 500 for feature extraction of a second order incremental index ($\Phi_{d2}$) according to this disclosure. For example, the method 500 described in FIG. 5 may be performed in conjunction with the computing device 200 in FIG. 2.

In operation 505, the computing device 200 uses the nominal mean value determined in the method 300 to mean center the process variables.

In operation 510, the computing device 200 determines the first derivative of the process variables by considering a block-wise approach with a length of $W_1$. The first derivative of the process variables can be determined by the following equation 12.

$$X_d^2(:,i) = \frac{1}{W_l}\left(\sum_{j=\frac{W_l}{2}}^{\frac{2W_l}{2}} X_d^1(:,i-j) - \sum_{j=1}^{\frac{W_l}{2}} X_d^1(:,i-j)\right) \qquad (12)$$

In operation 515, the computing device 200 collects a set of training data, such as $X_d^1 \in R^{N \times m}$.

In operation 520, the computing device 200 conducts a singular value decomposition on the training data. The singular value decomposition can be conducted by the following equation 13.

$$\frac{1}{\sqrt{N}} X_d^2 = U_d^2 \Lambda_d^2 V_d^{2T} \tag{13}$$

In operation 525, the computing device 200 selects the first $r_{d2}$ columns of the matrix $U_{d2}$, which include 95% of the variables variance by following the cumulative percentage variance criteria.

In operation 530, the computing device 200 builds a matrix that projects the $X_{d2}$ into origin under normal operating condition. The matrix can be built using the following equation 14, where $r_d^2$ represents the number of singular values that satisfies 95% of the cumulative parentage value criteria.

$$\tilde{\Pi}_d^2 = V_d^2(r_d^2:\text{end},:) V_d^2(r_d^2:\text{end},:)^T \tag{14}$$

In operation 535, the computing device 200 calculates the index using the new test data. The index can be calculated using following equation 15.

$$\varphi_d^2(i) = x_{test} \tilde{\Pi}_d^2 x_{test}^T \tag{15}$$

Figure 6:
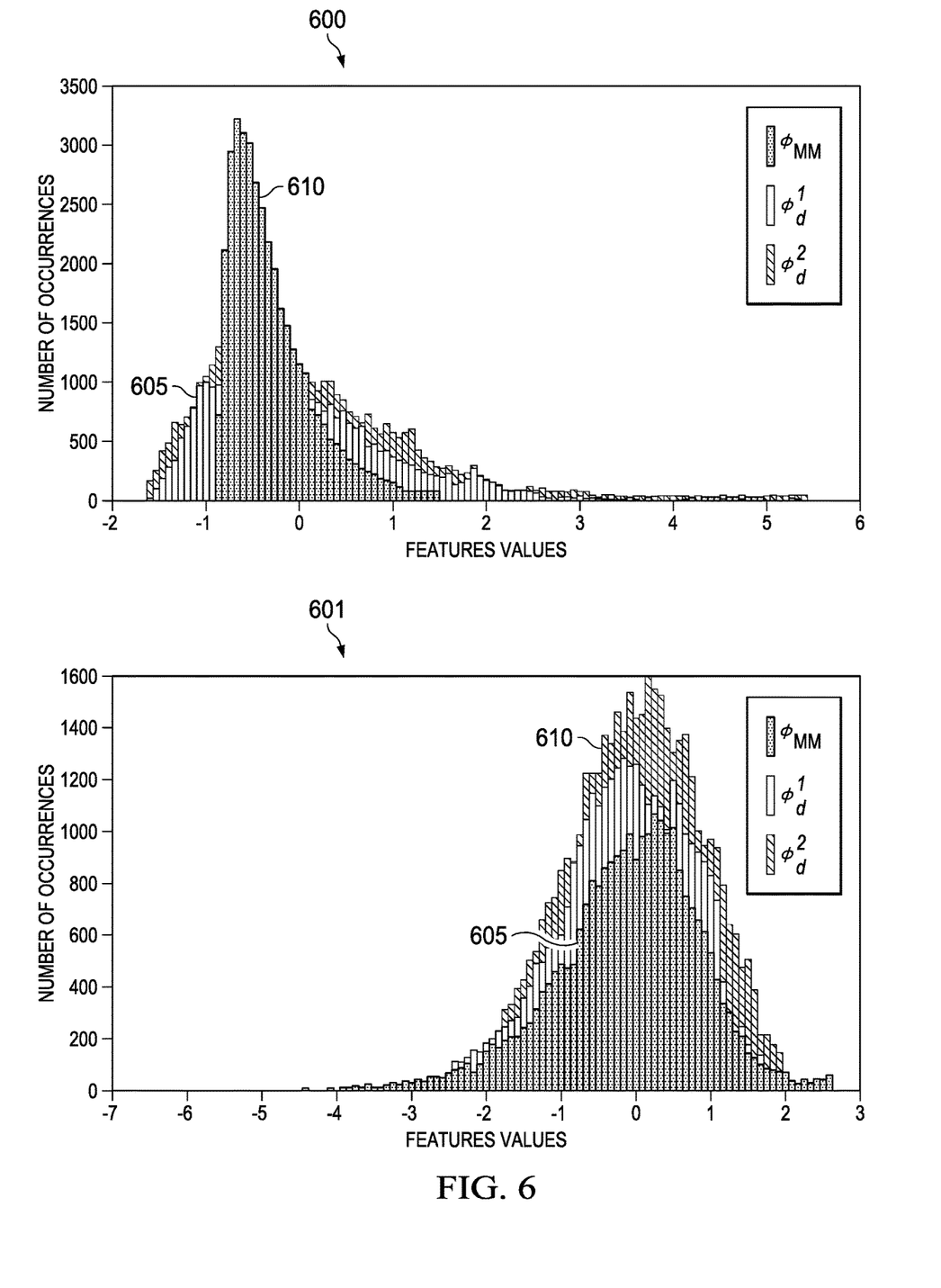
FIG. 6 illustrates histograms of the feature matrix without and with logarithm trick for a synthetic numerical example according to this disclosure.
Figure 7:
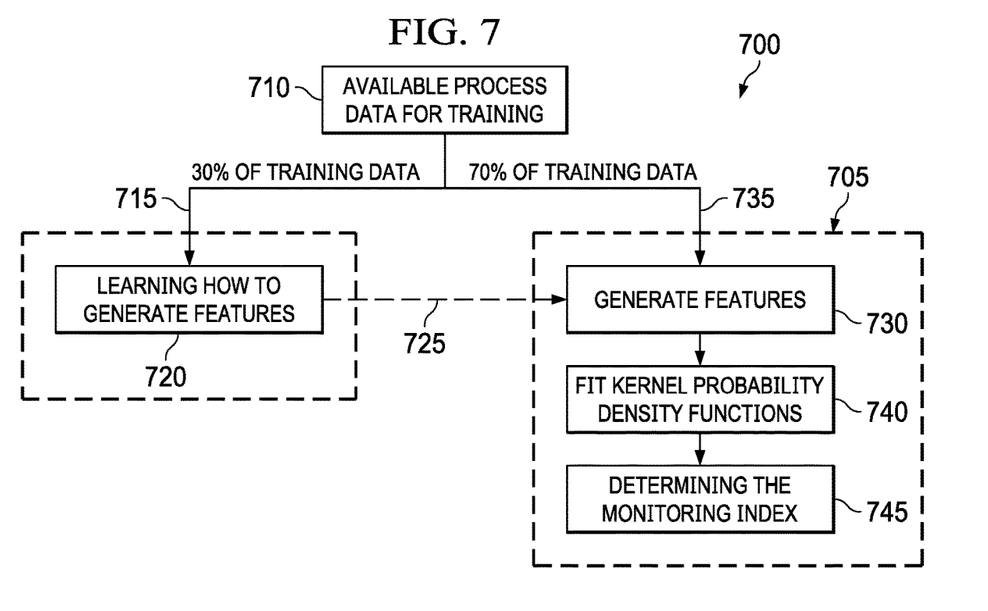
FIG. 7 illustrates a schematic diagram for a training step according to this disclosure.

FIG. 6 illustrates histograms 600 and 601 of the feature matrix without and with logarithm trick for a synthetic numerical example according to this disclosure. FIG. 7 illustrates a schematic diagram 700 for a training step according to this disclosure. The embodiments of the histograms 600 and 601 illustrated in FIG. 6 and the schematic diagram 700 are for illustration only. FIGS. 6 and 7 do not limit the scope of this disclosure to any particular implementation.

As can be seen in FIGS. 6 and 7, an unsupervised learning method 705 is utilized to distinguish non-stationary normal operating conditions 605 from faulty counterparts 610 without any need for tag information of the training data 710 from the process operators. As a rule of thumb, thirty percent of the available training data, which is the feature training data 715, is dedicated for learning 720 the base-line models required for generating the aforementioned features. The training data 715 includes a dynamic moving process mean. The dynamic moving process mean includes a lag of a sensor reading, which is accounted for in learning 720. Then, the result 725 of the unsupervised learning method 705 is used to generate features 730 on the cross-validation data 735, which is deemed to be seventy percent of the available training data.

For a given cross validation process data $X_c \in R^{N_c \times n_v}$ where $n_v$ is the number of process variables, the following equation 16 describes how to build the cross-validation feature matrix.

$$X_f = [x_1, x_2, x_3] \in R^{N_c \times n_f}, \tag{16}$$

where, $$x_1 = \log(\varphi_{MM}(i)) = \log(\bar{X}_c(i) M_\Phi \bar{X}_c(i)^T)$$

$$x_2 = \log(\varphi_d^1(i)) = \log(x_{d_c}^1(i) \tilde{\Pi}_d^1 x_{d_c}^{1T}(i))$$

$$x_3 = \log(\varphi_d^2(i)) = \log(x_{d_c}^2 \tilde{\Pi}_d^1 x_{d_c}^{2T}(i))$$

where $n_f$ is the number of features, which for this example is 3. Also, $x^1_{dc}$ and $x^2_{dc}$ can be calculated by equations 8 and 12. The reason for applying a log function to each determined feature is that the histogram distribution shape for each of the determined features is not similar to a normal Gaussian distribution. Therefore, a logarithm function is applied to transform the feature densities into a shape that is similar to a normal Gaussian distribution.

After generating the features 730, an overall condition health index 745 is proposed to distinguish process malfunction from normal operating condition including non-stationary mean variations and mode changes.

After generating the feature matrix for a cross validation data-set, a single overall index that can be solely used for detecting malfunctions is defined. To this aim, a normal range of the features are determined. Kernel probability density functions 740 are used to learn a kernel probability density function (PDF) for each column of the cross-validation feature matrix $X_f$. By considering that each column of the $X_f$ matrix is independently identically distributed random samples from an unknown distribution P with density function $f_{KDE}$. The kernel density function (KDE) can be expressed as the following equation 17.

$$f_{KDE}(x) = \frac{1}{N_c h^d} \sum_{i=1}^{N_c} K\left(\frac{x - X_c(i)}{h}\right) \tag{17}$$

where d is the dimension of the data, and K(.) is a kernel function (e.g. Gaussian, spherical, polynomial, etc.) satisfying Mercer's conditions, and h is the bandwidth of the KDE function that introduces a smoothing effect to the KDE. The bandwidth h=h(Xc (i)) can also be adaptively chosen depending on the location of the random variables. In that case, the KDE function can be represented by equation 18.

$$f_{KDE}(x) = \frac{1}{N_c} \sum_{i=1}^{N_c} \frac{1}{h(i)^d} K\left(\frac{x - X_c(i)}{h}\right) \tag{18}$$

Figure 8:
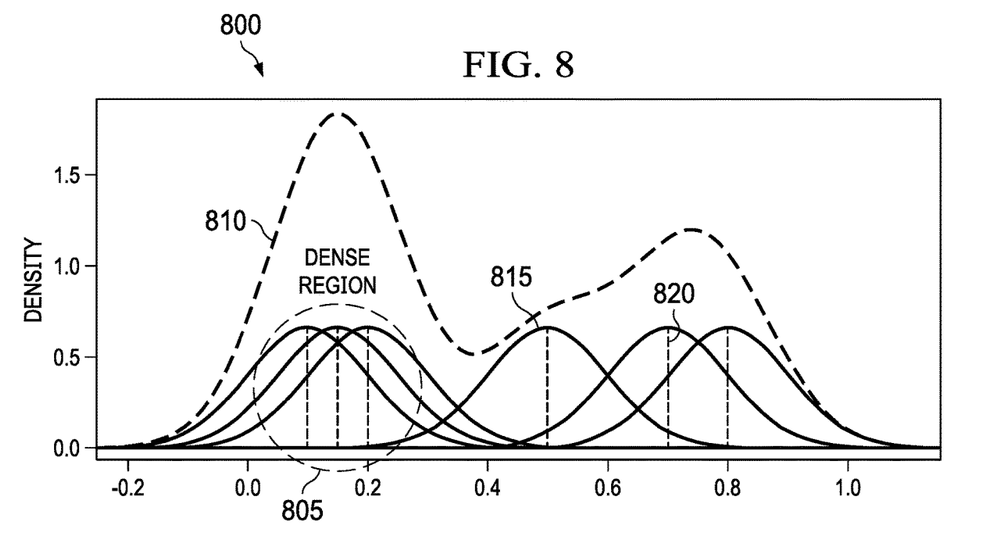
FIG. 8 illustrates a KDE density estimator with a dense region according to this disclosure.

FIG. 8 illustrates a KDE density estimator 800 with a dense region 805 according to this disclosure. The embodiment of the KDE density estimator 800 illustrated in FIG. 8 is for illustration only. FIG. 8 does not limit the scope of this disclosure to any particular implementation.

In general, KDE density estimator 800 tries to smooth the data points into a bump 815 according to a kernel function, in which the sum over all these bumps 815 result in the density estimator. In other words, at dense regions 805 with many observations 820 that happen to be the normal operating condition, there will be many bumps 815, hence the KDE function yields a large value.

The broken ellipse is the region 805 where the density is higher and as a result of the higher density, the KDE value 810 is larger. At this stage, for each column of the cross-validation feature matrix, an individual KDE is determined and preserved for calculation of the overall health index.

At the end, the trained KDEs are utilized to define a new overall health index R, which can be represented by the following equation 19.

$$P_j(i) = \int_{i-\tau}^{i+\tau} f_{KDE}^j(x_j(i)); \ j = 1, \ldots, n_f \tag{19}$$

-continued $$R(i) = \frac{1 - \prod_{j=1}^{n_f} P_j(i)}{(1+a)\left(a + \prod_{j=1}^{n_f} P_j(i)\right)}$$

where $P_j(i)$ is the probability of captured features at epoch-time (i) determined by integrating $f_{KDE}$. The constant $\tau$ is intuitively considered to be equal to $10^{-6}*(\max(x_j)-\min(x_j))$.

Figure 9:
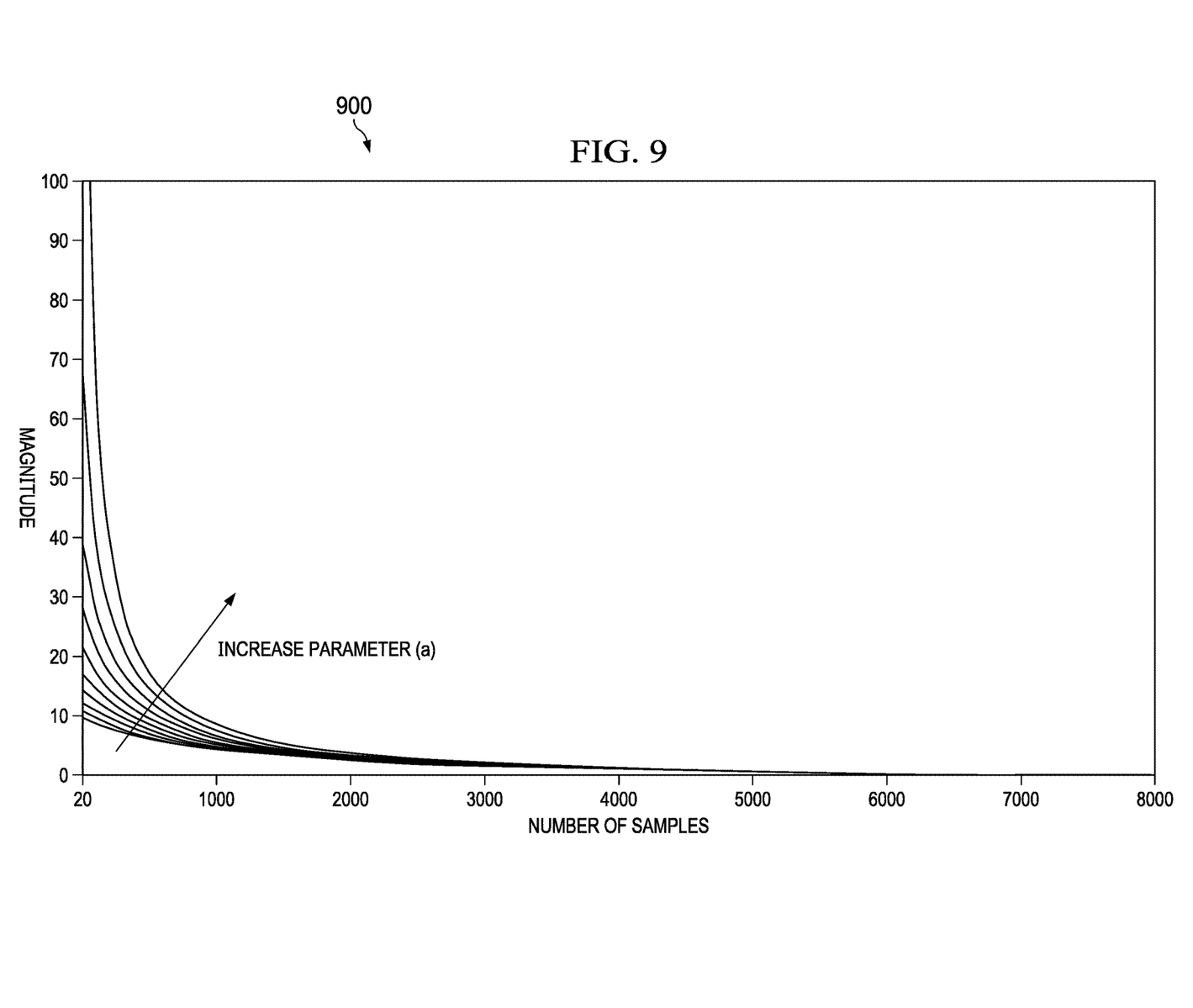
FIG. 9 illustrates an exemplary health index with different according to this disclosure.

FIG. 9 illustrates an exemplary health index 900 with different according to this disclosure. The embodiment of the exemplary health index 900 illustrated in FIG. 9 is for illustration only. FIG. 9 does not limit the scope of this disclosure to any particular implementation.

The proposed novel health index R has favorable attributes that (1) it yields to a maximum for faulty conditions and zero for normal operating conditions and (2) it is designed to mostly generate values close to zero or the maximum.

When there is a malfunction occurring in the process and the KDE values are almost zero or significantly close to zero, the value of the combined index R is $$R(X_f \approx 0) = \frac{1}{(a+1)a}.$$

. This feature is favorable for industrial users because they mostly desire to work with a bounded health index that yields to a maximum for faulty condition and zero for normal operating condition.

The health index is designed to generate values close to zero or the maximum. By a simple inspection of one case study in this research, it can be seen that the density of R around the threshold is far less that the vicinity of zero and maximum magnitude.

As the final step, the upper control limit or threshold is determined for the proposed health index R. As mentioned before, from the cross-validation data, the kernel density function for each feature is determined and considered as the reference and expected KDE for the future test process variables. Therefore, for each feature an a tails percentile of the corresponding KDE is calculated and its corresponding KDE value is considered as $\epsilon$ for that feature. For the $j_{th}$ feature, $\epsilon_j$ is can be determined by the following equation 20.

$$\epsilon_j = \min(f_{KDE}^j(x_j^{upper\ bound}), f_{KDE}^j(x_j^{lower\ bound})), \quad (20)$$

$$\text{s.t.} \int_{x_j^{lower\ bound}}^{x_j^{upper\ bound}} f_{KDE}^j(x_j)\, dx_j = \alpha$$

Hence, the overall upper control limit for the health index R can be determined by the following equation 21.

$$UCL_R = \frac{1 - \prod_{j=1}^{n_f} \epsilon_j}{(1+a)\left(a + \prod_{j=1}^{n_f} \epsilon_j\right)} \quad (21)$$

Upon observation of a new test process variables $x \in R^{n_v}$, the proposed health index can be determined by following equation 19 and, if (i)$\geq UCL_R$, there is a malfunction present in the process. A fault in the process can be determined when the proposed health index remains above the threshold for a predetermined amount of time and does not return to the safe region.

Figure 10:
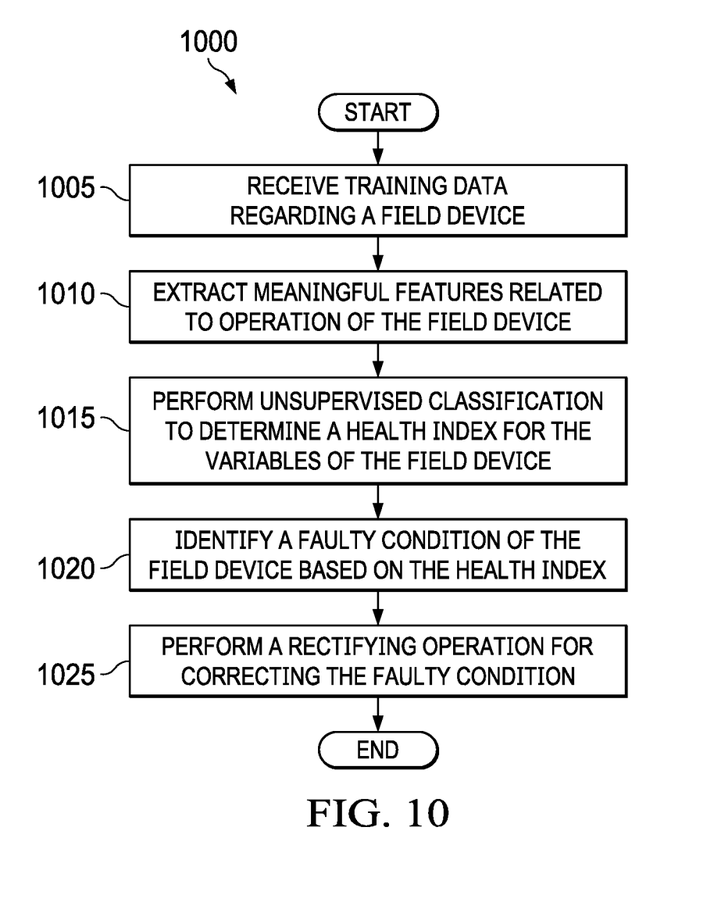
FIG. 10 illustrates an example method for improved fault detection in a non-stationary process through unsupervised machine learning according to this disclosure.

FIG. 10 illustrates an example method 1000 for improved fault detection in a non-stationary process through unsupervised machine learning according to this disclosure. For example, the method 1000 described in FIG. 10 may be performed in conjunction with the computing device 200 in FIG. 2.

In operation 1005, the computing device 200 receives training data regarding a field device. Examples of field devices are controllers 106, sensors 102a, and actuators 102b.

In operation 1010, the computing device 200 extracts meaningful features related to operation of the field device. A portion of the training data is used for the extraction of the meaningful features. For example, thirty percent of the training data could be used for the extraction of meaningful features. The features extraction includes determining a moving mean index, a first order incremental index, and a second order incremental index.

In operation 1015, the computing device 200 performs unsupervised probability-based classification to determine a health index that optimally distinguishes the normal time-varying behavior from the fault behavior for the process variables of the field device. The remaining portion of the training data or the portion of the training data not used for the extraction of meaningful features is used to determine the health index. For example, seventy percent of the training data is used for the determination of the health index when thirty percent of the training data is used for the feature extraction. The health index distinguishes a normal operating condition from a faulty condition.

In operation 1020, the computing device 200 identifies a faulty condition of the field device based on the health index. The health index generates values close to a maximum for faulty conditions and close to zero for normal operations. The faulty condition is determined or identified when the health index remains above a threshold for a predetermined amount of time. The predetermined threshold removes random noise from creating an alarm.

In operation 1025, the computing device 200 performs a rectifying operation for correcting the faulty condition. Rectifying operations include any operations to correct the faulty condition, including outputting a caution signal, shutting off or ramping down processes related to the field device, etc. The computing device 200 can output an alarm over a speaker or to a display indicating the faulty condition to a user.

Although FIG. 10 illustrates one example of a method 1000 for improved fault detection in a non-stationary process through unsupervised machine learning, various changes may be made to FIG. 10. For example, various steps shown in FIG. 10 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a memory; and
   a processor operably connected to the memory, the processor configured to:
      receive training data regarding a field device in an industrial process control and automation system, wherein the training data includes a dynamic process mean;
      extract a meaningful feature using a first portion of the training data related to the operation of the field device the meaningful feature extraction including determining a moving mean index, a first order incremental index and a second order incremental index;
      perform an unsupervised classification using a second portion of the training data to determine a health index for the meaningful feature;
      identify a faulty condition of real-time data using the health index of the meaningful feature; and
      perform a rectifying operation in the industrial process control and automation system for correcting the faulty condition including shutting off or ramping down a process related of the field device.

2. The apparatus of claim 1, wherein the health index distinguishes a normal operating condition from the faulty condition.

3. The apparatus of claim 1, wherein the health index generates values comprising a maximum for faulty conditions and zero for normal operation.

4. The apparatus of claim 1, wherein the faulty condition is determined when the health index remains above a threshold for a predetermined amount of time.

5. A method comprising:
   receiving training data regarding a field device in an industrial process control and automation system, wherein the training data includes a dynamic process mean;
   extracting a meaningful feature using a first portion of the training data related to the operation of the field device, the meaningful feature extraction including determining a moving mean index, a first order incremental index and a second order incremental index;
   performing an unsupervised classification using a second portion of the training data to determine a health index for the meaningful feature;
   identifying a faulty condition of real-time data using the health index of the meaningful feature; and
   performing a rectifying operation in the industrial process control and automation system for correcting the faulty condition including shutting off or ramping down a process of the field device.

6. The method of claim 5, wherein the health index distinguishes a normal operating condition from the faulty condition.

7. The method of claim 5, wherein the health index generates values comprising a maximum for faulty conditions and zero for normal operation.

8. The method of claim 5, wherein the faulty condition is determined when the health index remains above a threshold for a predetermined amount of time.

9. A non-transitory machine-readable medium encoded with executable instructions that, when executed, cause one or more processors to:
   receive training data regarding a field device in an industrial process control and automation system, wherein the training data includes a dynamic process mean;
   extract a meaningful feature using a first portion of the training data related to the operation of the field device, the meaningful feature extraction including determining a moving mean index, a first order incremental index and a second order incremental index;
   perform an unsupervised classification using a second portion of the training data to determine a health index for the meaningful feature;
   identify a faulty condition of real-time data using the health index of the meaningful feature; and
   perform a rectifying operation in the industrial process control and automation system for correcting the faulty condition including shutting off or ramping down a process of the field device.

10. The non-transitory machine-readable medium of claim 9, wherein the health index distinguishes a normal operating condition from the faulty condition.

11. The non-transitory machine-readable medium of claim 9, wherein the health index generates values comprising a maximum for faulty conditions and zero for normal operation.

12. The non-transitory machine-readable medium of claim 9, wherein the faulty condition is determined when the health index remains above a threshold for a predetermined amount of time.

* * * * *